(No Model.)

W. E. VOSE.
DEVICE FOR STOPPING RUNAWAY HORSES.

No. 546,794. Patented Sept. 24, 1895.

Witnesses:
Chas. E. Gaylord
Lute B. Alter

Inventor:
William E. Vose,
By Dyrenforth and Dyrenforth,
Attys.

United States Patent Office.

WILLIAM E. VOSE, OF CHICAGO, ILLINOIS.

DEVICE FOR STOPPING RUNAWAY HORSES.

SPECIFICATION forming part of Letters Patent No. 546,794, dated September 24, 1895.

Application filed June 16, 1893. Serial No. 477,875. (No model.)

*To all whom it may concern:*

Be it known that I, WILLIAM E. VOSE, a citizen of the United States, residing at Chicago, in the county of Cook and State of Illinois, have invented a new and useful Improvement in Devices for Stopping Runaway Horses, of which the following is a specification.

My invention relates to an improvement in the class of devices for stopping runaway horses by compressing their nostrils by means supported in proper position for the purpose on the head of the animal and operative from the conveyance to which the animal is harnessed.

The object of my invention is to provide a novel construction of device in the class referred to, which shall be simple and inexpensive to manufacture and be easily and reliably operative and effective in its operation and adapted to be used independently of a bridle-bit.

Figure 1:
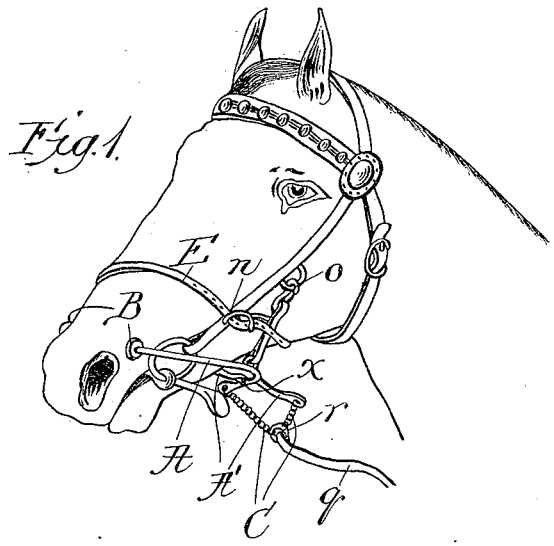
Figure 2:
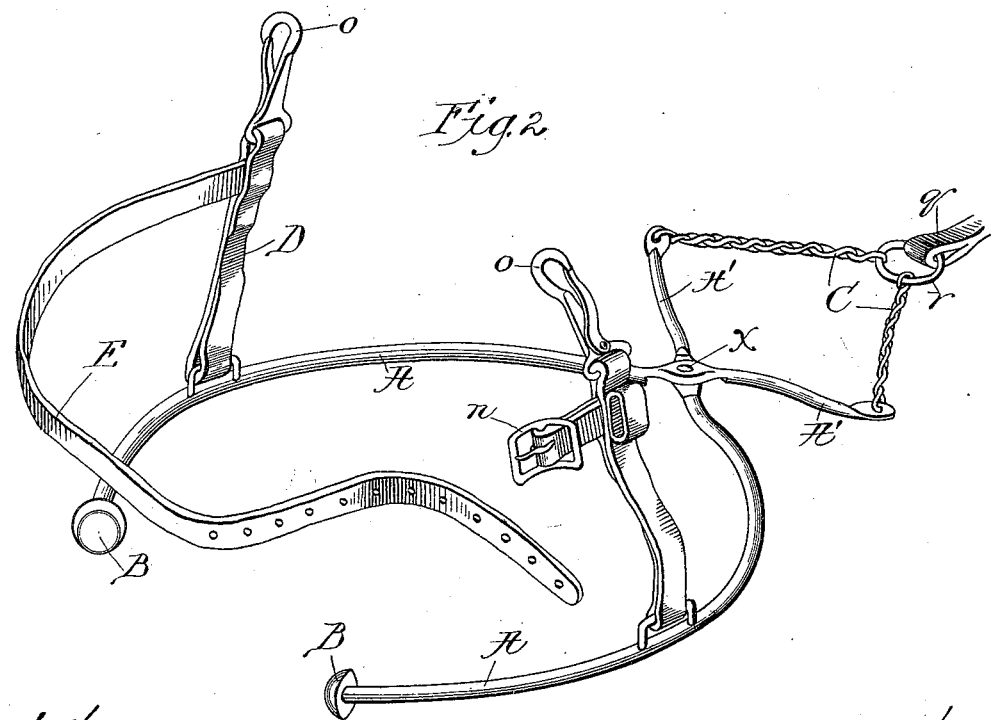

Referring to the accompanying drawings, Figure 1 is a view showing my device as operatively applied on a horse, and Fig. 2 is an enlarged perspective view of the device.

A A are jaws, shown as resembling in form the jaws of ice-tongs, presenting curves from their outer ends, at which they are provided with knobs B B to the point $x$ of their pivotal connection, where they are crossed and whence they are extended into arms A', which are connected by a flexible medium, as the chain C, having a central ring $r$, at which to fasten a pull-strap $q$. I prefer to form the jaws of metal and to employ comparatively light but adequately stiff wire to produce them, the knobs B being composed of hard rubber or even of wood or metal, when, however, they should be covered with leather, felt, or the like. On the jaws I provide, in suitable position between their pivotal connection and outer ends, straps D, at which to connect the device with the bridle at opposite sides of the animal's head, and thus to suspend it in such position as will cause the knobs to flank the nostrils without, however, normally touching them, and from which the jaws extend backward below the jaws of the animal, and to hold the device in place I connect the straps D by a strap E, which passes over the bridge of the animal's nose. As shown, the straps D are fastened in loops $p$, provided in proper place on the jaws A, and carry snaps $o$, at which to connect them with suitable parts of the bridle, though the means of producing the desired connection may, without departure from my invention, be of any kind that will answer the purpose. The connection between the nose-strap and straps D may also be of any suitable kind, though I prefer for the purpose to provide each of the suspension-straps, as shown, with a laterally-extending buckle $n$ to engage an end of the nose-strap.

With my improved device in place, the pull-strap $q$ is intended to extend from the ring $r$ into conveniently accessible reach of the driver, who may thus pull on it in case of an attempt of the animal to run away, and thereby produce compression of the nostrils just back of the openings between the knobs B, with the desired effect on the animal.

What I claim as new, and desire to secure by Letters Patent, is—

A device for stopping runaway horses, and adapted to be used independently of a bridle-bit, said device comprising, in combination, a pair of pivotally connected curved jaws A carrying knobs B at their forward ends to flank the nostrils of the animal and straps D at which to suspend the device on the bridle, said straps being connected by a nose-strap E, the jaws crossing each other at their pivotal connection and having arms A' behind the same, and a chain C, or the like, flexibly connecting said arms and at which to fasten a pull-strap, substantially as described.

WILLIAM E. VOSE.

In presence of—
ROBT. REED,
J. S. SMITH.